United States Patent
Hamidi-Sepehr et al.

(10) Patent No.: US 10,856,282 B2
(45) Date of Patent: Dec. 1, 2020

(54) INTERLACES ALLOCATION AND INDICATION

(71) Applicant: Apple Inc., Cupertino, CA (US)

(72) Inventors: Fatemeh Hamidi-Sepehr, Milpitas, CA (US); Qiaoyang Ye, Fremont, CA (US); Hwan-Joon Kwon, Portland, OR (US); Huaning Niu, San Jose, CA (US); Abhijeet Bhorkar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 44 days.

(21) Appl. No.: 16/072,132

(22) PCT Filed: Feb. 16, 2017

(86) PCT No.: PCT/US2017/018148
§ 371 (c)(1),
(2) Date: Dec. 4, 2018

(87) PCT Pub. No.: WO2017/146987
PCT Pub. Date: Aug. 31, 2017

(65) Prior Publication Data
US 2019/0068347 A1  Feb. 28, 2019

Related U.S. Application Data

(60) Provisional application No. 62/298,299, filed on Feb. 22, 2016.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04L 5/0073* (2013.01);
(Continued)

(58) Field of Classification Search
CPC ............ H04W 72/04; H04W 72/0406; H04W 72/042; H04W 72/12; H04L 5/0007
See application file for complete search history.

(56) References Cited

U.S. PATENT DOCUMENTS

| | | | |
|---|---|---|---|
| 2015/0156638 A1* | 6/2015 | Yerramalli | H04L 5/0051 455/454 |
| 2015/0181589 A1 | 6/2015 | Luo et al. | |
| 2019/0036653 A1* | 1/2019 | Lunttila | H04W 76/27 |

FOREIGN PATENT DOCUMENTS

| | | |
|---|---|---|
| WO | 2005114940 A1 | 12/2005 |
| WO | 2015084527 A1 | 6/2015 |

OTHER PUBLICATIONS

International Bureau—International Search Report and Written Opinion dated May 30, 2017, from International Application No. PCT/US2017/018148, 15 pages.
(Continued)

*Primary Examiner* — Ashley Shivers
(74) *Attorney, Agent, or Firm* — Fish & Richardson P.C.

(57) ABSTRACT

An apparatus for use in an eNB, the apparatus includes circuitry to generate an assignment of one or more interlaces to a UE within a cell managed by the eNB, where the one or more interlaces are selected from a total number of interlaces, and an interlace of the total number of interlaces may include multiple resource blocks spanning within a system bandwidth. The circuitry included in the apparatus is further to encode the assignment by a bit string including one or more bits, which may be a bitmap or an encoding bit string. The circuitry included in the apparatus is further to transmit the bit string to the UE. Other embodiments may also be described and claimed.

31 Claims, 9 Drawing Sheets

(51) Int. Cl.
*H04W 72/12* (2009.01)
*H04L 27/26* (2006.01)
*H04W 24/02* (2009.01)
*H04W 16/14* (2009.01)

(52) U.S. Cl.
CPC ......... *H04L 27/2643* (2013.01); *H04W 24/02* (2013.01); *H04W 72/12* (2013.01); *H04L 5/0007* (2013.01); *H04L 5/0094* (2013.01); *H04W 16/14* (2013.01)

(56) References Cited

OTHER PUBLICATIONS

Ericsson, "Uplink Resource Allocation Design for Enhanced LAA," 3GPP TSG-RAN WG1#84, R1-160994, Agenda Item: 7.3.1.1, Feb. 15-19, 2016, St Julian's, Malta, 3 pages.
ETSI, "Broadband Radio Access Networks (BRAN); 5 GHz high performance RLAN; Harmonized EN covering the essential requirements of article 3.2 of the R&TTE Directive," EN 301 893 V1.8.1 (Mar. 2015), 93 pages.

* cited by examiner

Table 1. Illustration of possible interface assignments for cases with 10 interfaces

| Starting interface index | 0 | 1 | 2 | 3 | 4 | 5 | 6 | 7 | 8 | 9 |
|---|---|---|---|---|---|---|---|---|---|---|
| # of interfaces that can be assigned in case of single-user | {1, 2, 3, 4, 5, 6, 7, 8, 9, 10} | {1, 2, 3, 4, 5, 6, 7, 8, 9} | {1, 2, 3, 4, 5, 6, 7, 8} | {1, 2, 3, 4, 5, 6, 7} | {1, 2, 3, 4, 5, 6} | {1, 2, 3, 4, 5} | {1, 2, 3, 4} | {1, 2, 3} | {1, 2} | {1} |

INTERLACES ALLOCATION AND INDICATION

CROSS REFERENCE TO RELATED APPLICATIONS

The present application is a national phase entry under 35 U.S.C. § 371 of International Application No. PCT/US2017/0018148, filed Feb. 16, 2017, entitled "INTERLACES ALLOCATION AND INDICATION", which designates the United States of America, which claims priority from U.S. Provisional Patent Application No. 62/298,299, filed Feb. 22, 2016, and entitled "RESOURCE ALLOCATION AND INDICATION TO ACHIEVE UPLINK INTERFERENCE RANDOMIZATION FOR UNLICENSED OPERATION," the entire disclosures of which are hereby incorporated by reference.

TECHNICAL FIELD

Embodiments generally may relate to the field of wireless communications.

BACKGROUND

Long Term Evolution (LTE) networks may provide communication on licensed spectrum.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
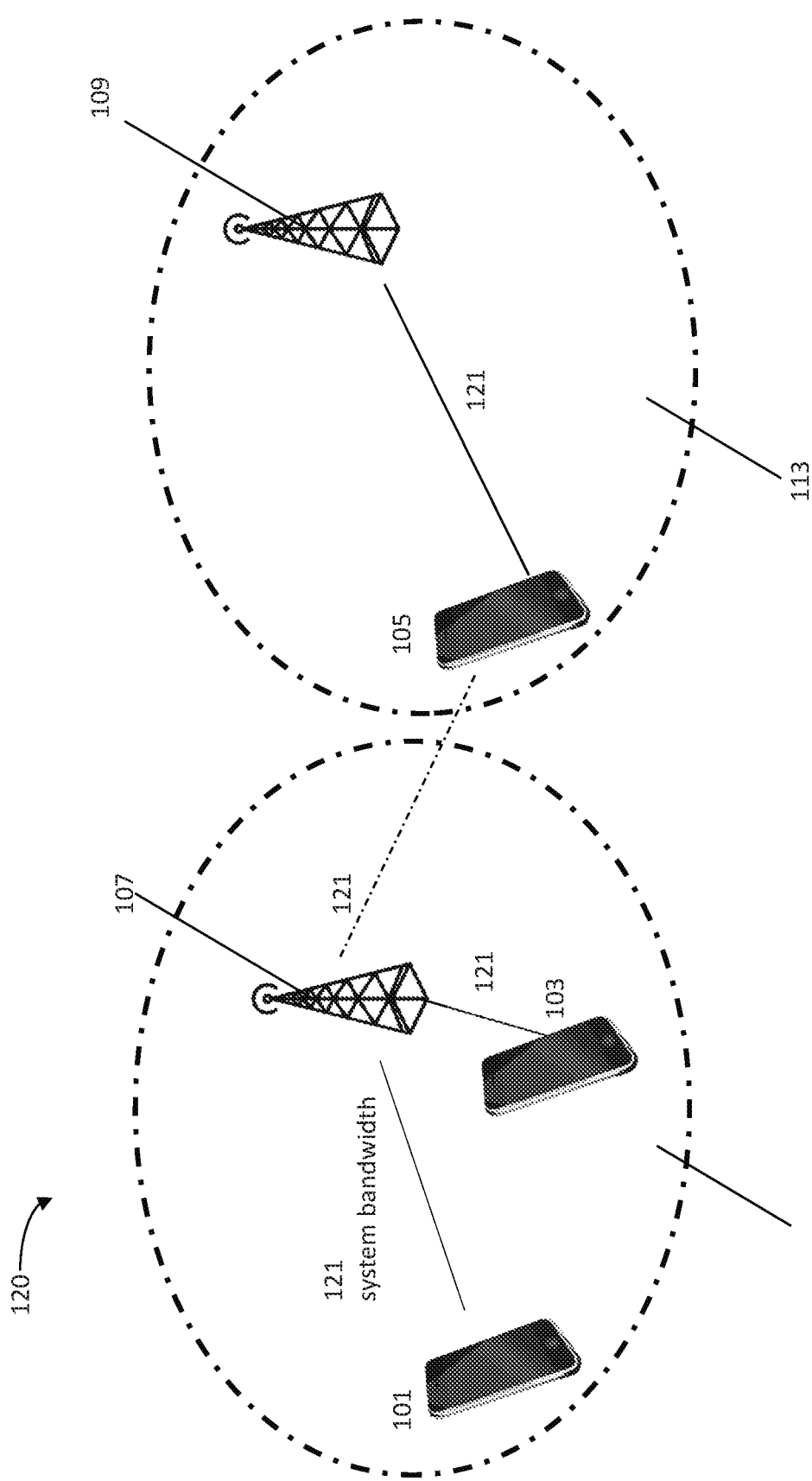
FIG. 1 illustrates a schematic high-level example of a network that includes multiple user equipments (UEs), multiple evolved NodeBs (eNBs) within multiple cells, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed embodiments. However, it will be apparent to those skilled in the art having the benefit of the present disclosure that the various aspects of the embodiments and claims may be practiced in other examples that depart from these specific details. In certain instances, descriptions of well-known devices, circuits, and methods are omitted so as not to obscure the description of the present embodiments with unnecessary detail.

For the purposes of the present disclosure, the phrases "A/B," "A or B," and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments a module may be a distinct circuit, while in other embodiments a module may include a plurality of circuits.

To cope with ever-increasing traffic demand, the 3rd Generation Partnership Project (3GPP) has been continuously increasing the network capacity by improving the spectral efficiency of the Long Term Evolution (LTE) system through various techniques. One way to improve the network capacity is to expand the system bandwidth, e.g., to enable the operation of an LTE system in unlicensed spectrum. One mechanism to expand the system bandwidth of an LTE system is to use licensed assisted access (LAA), where unlicensed spectrum is used to supplement licensed spectrum, by aggregating together the licensed and unlicensed component carriers. Another LTE-based system, e.g., a MulteFire network or system, may deploy a self-contained and standalone network architecture without a licensed carrier. In both LAA and MulteFire networks or systems, various modulation schemes, e.g., block-interleaved frequency division multiple access (B-IFDMA), may be used as a multiple access modulation scheme to assign a number of possible interlaces within the system bandwidth, which may include either licensed spectrum or unlicensed spectrum, to a user equipment (UE) for uplink (UL) transmission. Various embodiments described herein may include techniques for systems operating on unlicensed spectrum e.g., MulteFire systems, LAA systems, to reduce interference on UL transmission. Embodiments herein may include assignments of one or more interlaces from a set of total number of interlaces within a system bandwidth to a UE. In particular, the assignment of one or more interlaces to a UE may be generated by using different randomization methods in different cells to reduce interference in neighboring cells for various causes, e.g., caused by hidden nodes. Other techniques, e.g., frequency hopping techniques such as cell-specific interlace hopping across slots/subframes or cell-specific physical resource block (RB) mapping of logical interlace, may be used to reduce interference in neighboring cells as well.

The assignments of one or more interlaces to a UE from a set of total number of interlaces within a system bandwidth may be indicated by bit strings including one or more bits based on various techniques, such as bitmap, or encoding of all possible assignments. The bit strings including one or more bits to encode an assignment may reduce signaling overhead by reducing the number of bits used to indicate an interlace assignment. The bit strings indicating the interlace assignments may be transmitted from an evolved NodeB (eNB) to the UE by radio resource control (RRC) signaling, a system information block (SIB), an UL grant, high-level signaling, or other system messages.

FIG. 1 illustrates a schematic high-level example of a network 120 that includes multiple UEs, such as UE 101, UE 103, and UE 105, and multiple eNBs, such as eNB 107 and eNB 109, within multiple cells, such as cell 111 and cell 113, in accordance with various embodiments.

An eNB, e.g., the eNB 107 and the eNB 109, may communicate with UEs, e.g., the UE 101, the UE 103, and the UE 105, within cells, e.g., cell 111 and cell 113. The eNB 107 may communicate with the UE 101 and the UE 103 within the cell 111. The eNB 109 may communicate with the UE 105 within the cell 113. There may be more UEs than those shown in FIG. 1. Each cell, e.g., the cell 111 and the cell 113, may have a different identification, e.g., an identification number, and may be managed by the eNB, e.g., the eNB 107 and the eNB 109. The UEs, e.g., the UE 101, the UE 103, and the UE 105, may be in various positions within the cells, and may change their positions with time. There may be different number of UEs in different cells. For example, a number of UEs within the cell 111 may be different from a number of UEs within the cell 113.

The UEs in one cell, such as the UE 101 and the UE 103 in the cell 111 may create inter-cell interference for UEs in another cell, such as the UE 105 in the cell 113. Frequency hopping techniques (e.g., hopping over slot or subframe) may be applied as one remedy to reduce inter-cell interference. Besides frequency hopping, embodiments herein may present appropriate resource allocation techniques for allocating system bandwidth 121 of the network 120 to the UEs to reduce the inter-cell interference.

The network 120 may be an LTE-based network operating in the system bandwidth 121, where the system bandwidth 121 may include unlicensed spectrum, licensed spectrum, or both unlicensed and licensed spectrum. For example, the network 120 may be an LAA network, a MulteFire network, or any other network operating in unlicensed spectrum and/or licensed spectrum.

The network 120 may operate using various modulation schemes, e.g., B-IFDMA. In embodiments, a B-IFDMA modulation scheme may have low sensitivity to carrier frequency offset (CFO) errors and may reduce inter-carrier interference (ICI) impairments. Other modulation schemes, such as schemes related to Orthogonal Frequency Division Multiplex (OFDM), Orthogonal Frequency Division Multiplex (OFDMA), or Single Frequency Division Multiple Access (SC-FDMA) may be used as well. Embodiments herein may be described using B-IFDMA modulation scheme as an example, and they may be applicable to other modulation schemes for the network 120.

Figure 2:
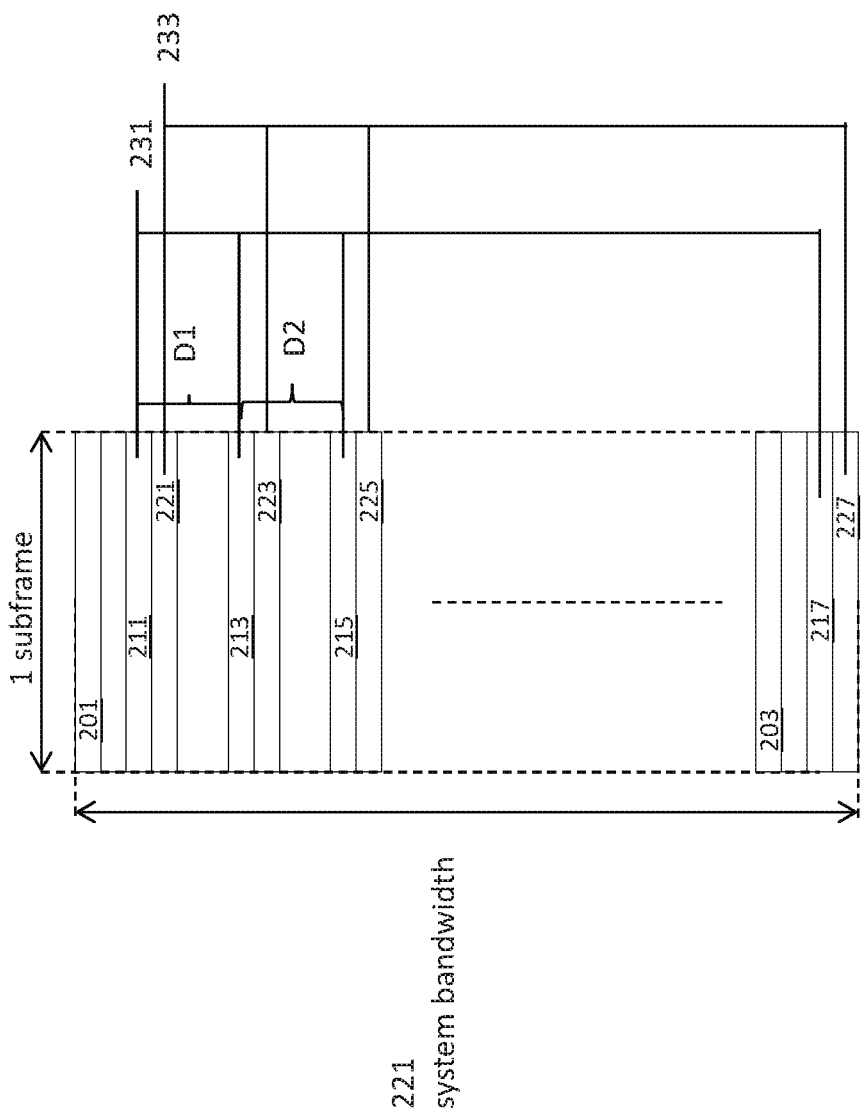
FIG. 2 illustrates an example of a set of interlaces within a system bandwidth to be assigned to a UE, in accordance with various embodiments.
Figure 3:
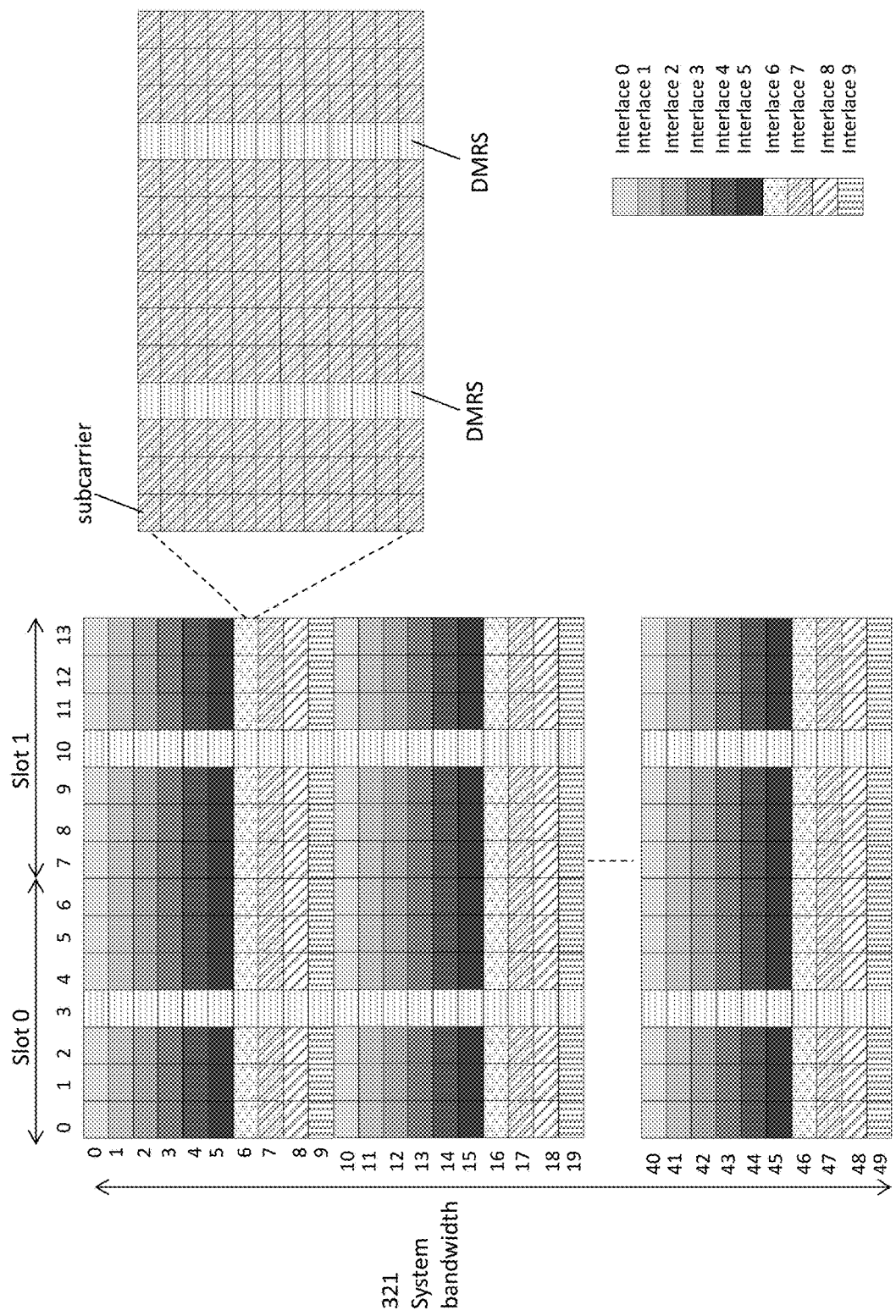
FIG. 3 illustrates an example of a set of total number of interlaces within a system bandwidth to be assigned to a UE, in accordance with various embodiments.

When a modulation scheme, e.g., B-IFDMA, is used, the system bandwidth 121 may be referred to as a B-IFDMA waveform, and may be divided into a set of total number of interlaces. More examples of interlaces of a system bandwidth are shown in FIG. 2 and FIG. 3. An eNB may assign one or more interlaces from the set of total number of interlaces of a B-IFDMA waveform to a UE. For example, the eNB 107 may assign one or more interlaces to the UE 101 in the cell 111, while the eNB 109 may assign one or more interlaces to the UE 105 in the cell 113.

If B-IFDMA is used in the network 120 in its original form, the interlace assignments by an eNB, e.g., the eNB 107 or the eNB 109, to UEs in the network 120 may suffer from the lack of interference diversity and potential hidden node problems. For example, when an interlace is assigned to the UE 101 in the cell 111, and the same interlace is assigned to the UE 105 in the neighboring cell 113, the eNB 107 may receive UL signals from both the UE 101 and the UE 105 in the same interlace. The signal received from the UE 105 may cause interference to the signal from the UE 101. The UE 105 may behave like a hidden node to the UE 101.

In embodiments, an eNB may assign one or more interlaces from the set of total number of interlaces to a UE in a manner to reduce the interference. For example, an eNB may generate interlace assignments by a predefined way, or randomly based on an identification of a cell the eNB is in, a number of UEs in the cell, or a location of the UE within the cell. In particular, the assignment of one or more interlaces from the set of total number of interlaces may be generated by different randomization method in different cells to reduce interference in neighboring cells. For example, the eNB 107 may assign a set of one or more interlaces to the UE 101 in the cell 111 using a first randomization method, while the eNB 109 may assign another set of one or more interlaces to the UE 105 in the cell 113 using a second randomization method different from the first randomization method.

Additionally and alternatively, the interlace assignments may be generated based on other criteria, such as a power spectral density (PSD) of the cell, a transmission power constraint of the UE, an allowed output power of the UE, a peak-to-average power ratio (PAPR) of the UE, or a cubic metric (CM) of the cell. Furthermore, the interlace assignments may be generated based on some regulatory specifications, such as regulatory specification provided by the European Telecommunications Standards Institute (ETSI). For example, based on an ETSI specification, a maximum PSD of 10 dBm/MHz for 5150-5350 MHz may be used. In addition, the regulations may impose a band specific total maximum transmission power of the transmitter constraint indicated by Effective Isotropic Radiated Power (EIRP).

In embodiments, the interlace assignments to a UE may be related to the transmission power of the UE. For example, regulations may impose a band specific maximum transmission power to the UE depending on the interlace assignments. When only one interlace is assigned to a UE, the maximum transmission power of the UE may be 20 dBm. When more than one interlaces may be assigned to a UE, the maximum transmission power of the UE may depend on the combination and ordering of the assigned interlaces. Furthermore, the maximum transmission power of the UE may depend on the underlying resource block pattern of the interlaces assigned to the UE.

The interlace assignments generated by an eNB to a UE may be indicated or encoded by a bit string including one or more bits to provide an indication of the interlace assignments. The eNB may transmit the bit string including one or more bits to indicate interlace assignments to the UE. The eNB may transmit the bit string to the UE, by RRC signaling, a SIB, an UL grant, or other signaling techniques.

FIG. 2 illustrates an example of a set of interlaces within a system bandwidth 221 to be assigned to a UE, in accordance with various embodiments. In embodiments, the system bandwidth 221 may be an example of the system bandwidth 121 of FIG. 1. The interlaces of the system bandwidth 221 may be assigned to a UE, e.g., a UE similar to the UE 101, the UE 103, and the UE 105.

The system bandwidth 221 may include a number of resource blocks (RBs), where a RB may be a unit of resources that can be allocated or assigned to a UE. For example, the system bandwidth 221 may include RB 201, RB 203, RB 211, RB 213, RB 215, RB 217, RB 221, RB 223, RB 225, and RB 227, and other RBs not shown, to be assigned to a UE. A RB, e.g., RB 201, RB 203, RB 211, RB 213, RB 215, RB 217, RB 221, RB 223, RB 225, and RB 227, may have a uniform bandwidth, e.g., 180 kHz, in frequency domain and 1 slot or 1 subframe length in time domain.

RBs of the system bandwidth 221 may be assigned to a UE in various ways. For example, each RB may be assigned individually to a UE. However, a UE with individually assigned RBs may not transmit at the allowed maximum transmission power, limiting the UL coverage and performance. In embodiments, the RBs may be allocated or assigned to a UE as interlaces, where an interlace may include a collection of RBs. In one embodiment, when B-IFDMA is used as the modulation scheme, an interlace may include a collection of equally spaced RBs. Furthermore, in some embodiments, the collection of RBs in an interlace may be distributed across the entire system bandwidth 221.

For example, an interlace, e.g., interlace 231 and interlace 233, may include a collection of equally spaced RBs distributed through the system bandwidth 221. The interlace 231 may include the RB 211, the RB 213, the RB 215, and the RB 217. Similarly, the interlace 233 may include the RB 221, the RB 223, the RB 225, and the RB 227. Two neighboring RBs of an interlace may have an equal inter-RB distance, or simply referred to as a distance. For example, the distance between the RB 211 and the RB 213 may be D1, while the distance between the RB 213 and the RB 215 may be D2, where D1 may be equal to D2. Similarly, a distance between any two neighboring RBs in the interlace 233 may be equal as well.

The design of a B-IFDMA modulation scheme may depend on the choice of the inter-RB distance, e.g., D1, for each interlace. The inter-RB distance may determine the total number of interlaces available within the system bandwidth 221. In embodiments, for a B-IFDMA modulation scheme, the total number of interlaces may be 5, 6, 10, 12, or other numbers. For example, FIG. 3 shows a system bandwidth with a total of 10 interlaces. An eNB may assign one or more interlaces from a set of total number of interlaces of a B-IFDMA waveform to a UE.

FIG. 3 illustrates another example of a set of total number of interlaces, e.g., ten interlaces, within a system bandwidth 321, in accordance with various embodiments. In embodiments, the system bandwidth 321, which may be an example of the system bandwidth 121 of FIG. 1, may represent a Physical Uplink Shared Channel (PUSCH). Interlaces of the set of total number of interlaces of the system bandwidth 321 may be assigned to a UE, e.g., a UE similar to the UE 101, the UE 103, and the UE 105.

The system bandwidth 321 may include a number of RBs, for example, RB 0 to RB 49. The number of RBs is for example only and is not limiting. For some other embodiments, there may be other number of RBs, e.g., 100 RBs. An RB may be a unit of resources that can be allocated to a UE. An RB may have a uniform bandwidth in frequency domain, e.g., 12 subcarriers, and 1 subframe length in time domain.

The system bandwidth 321 may be divided into a set of total number of interlaces. As shown, the set of total number of interlaces may include 10 interlaces. Each interlace may include a collection of equally spaced RBs. For example, interlace 0 may include the RBs numbered as 0, 10, 20, 30, and 40, with an inter RB distance 10 between the RBs. In FIG. 3, RBs within a same interlace are marked by a same shade and/or pattern.

One or more interlaces may be assigned to a UE, e.g., a UE similar to the UE 101, the UE 103, and the UE 105. The UE may use the interlace assigned for a PUSCH transmission to an eNB, wherein a reference signal, e.g., demodulation reference signal (DMRS) may be transmitted on 4th and 11th symbol of the subframe.

Figure 4:
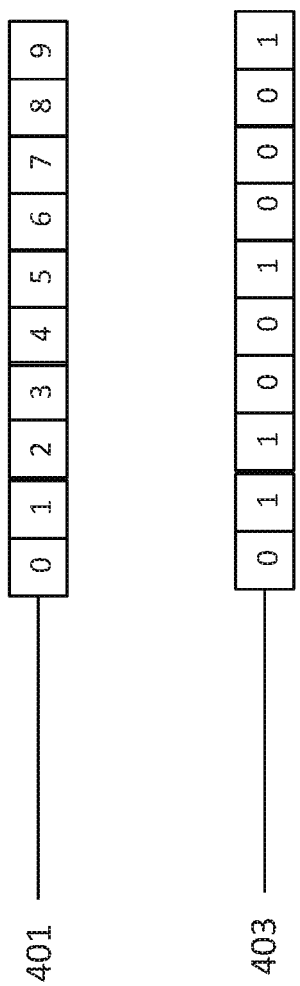
FIG. 4 illustrates a bitmap indicating an assignment of interlaces from a set of total number of interlaces within a system bandwidth, in accordance with various embodiments.

FIG. 4 illustrates a bitmap 401 indicating an assignment of interlaces from a set of total number of interlaces within a system bandwidth, in accordance with various embodiments. For example, the bitmap 401 may be used to indicate the assignments of interlaces from the set of interlaces of the system bandwidth 321 shown in FIG. 3, which may be assigned to a UE, e.g., a UE similar to the UE 101, the UE 103, and the UE 105 in FIG. 1.

For the set of interlaces shown in FIG. 3, the bitmap 401 may include 10 bits, where a bit in the bitmap may correspond to an interlace of the set of total number of interlaces that may be assigned to a UE. For example, the bit 0 may correspond to the interlace 0 in FIG. 3, which represents the RB 0, RB 10, RB 20, RB 30 and RB 40. A bit in the bitmap 401 may indicate whether a corresponding interlace in the set of total number of interlaces is assigned to the UE or not. For example, bitmap 401 may have a bit string 403, "0110010001," which represents that the interlace 1, the interlace 2, the interlace 5, and the interlace 9 are assigned to a UE.

A bitmap can indicate a flexible interlace assignment. For example, when an eNB assigns 4 interlaces to a UE, the eNB can assign any 4 interlaces of the 10 total interlaces, and indicate such an interlace assignment by a bitmap. In particular, interlaces assigned may not be consecutive. For example, the bit string 403 indicates the assignment of the interlace 1, the interlace 2, the interlace 5, and the interlace 9, which are not consecutive. Compared to the bit string encoding technique shown in FIG. 5, the bitmap may use higher number of bits to indicate interlace assignments of one or more interlaces from the set of total number of interlaces.

Figure 5:
FIG. 5 illustrates a bit string of one or more bits encoding an assignment of consecutive interlaces from an ordered set of total number of interlaces within a system bandwidth, in accordance with various embodiments.

FIG. 5 illustrates a bit string 511 of one or more bits encoding an assignment of consecutive interlaces from an ordered set of total number of interlaces within a system bandwidth, in accordance with various embodiments. In embodiments, the bit string 511 may be used to indicate the assignments of interlaces from the total 10 interlaces of the system bandwidth 321 shown in FIG. 3, which may be assigned to a UE, e.g., a UE similar to the UE 101, the UE 103, and the UE 105 in FIG. 1.

For a set of total number of interlaces, the interlaces may be ordered to have an index, and the set of total number of interlaces becomes an ordered set of total number of interlaces. For example, as shown in FIG. 3, the 10 interlaces, interlace 0, interlace 1, . . . , interlace 9, may be ordered by natural order, e.g., interlace 0<interlace 1<<interlace 9. Alternatively, the set of 10 interlaces including interlace 0, interlace 1, . . . , interlace 9 may be ordered in other ways. For example, in one embodiment, the order may be interlace 1<interlace 0<interlace 2<<interlace 9. The interlace ordering can be generated randomly, or it can be predefined. In addition, different cells, e.g., the cell 111 and the cell 113 of FIG. 1, may use different interlace ordering to increase the interlace diversity and reduce the interferences. In embodiments, the interlace order can be randomly generated based on cell-ID, to avoid inter-cell interference.

In an ordered set of total number of interlaces, a set of one or more consecutive interlaces may be represented by a pair of numbers (a, b), where the first number "a" may be the starting index and the second number "b" may be the length of the set of one or more consecutive interlaces. For example, the pair (0, 1) represents a set of consecutive interlaces with a starting index 0 and 1 interlace (interlace 0). Translating this set of consecutive interlaces into bitmap representation, the bitmap 501, "1000000000" is an equivalent representation of the set of consecutive interlaces (0, 1). Similarly, the pair (0, 2) represents a set of consecutive interlaces with a starting index 0 and length 2 (interlace 0 and interlace 1), equivalent to the bitmap 503, "1100000000." Furthermore, the pair (0, 10) represents a set of consecutive interlaces with a starting index 0 and length 10 (interlace 0 to interlace 9), equivalent to the bitmap 507 "1111111111."

Table 1 in FIG. 5 illustrates all the possible sets of consecutive interlaces represented by a pair of numbers, where a set of consecutive interlaces is selected from an ordered set of total 10 interlaces. The starting index may be in the range from 0 to 9, and the length of a set of consecutive interlaces may depend on the starting index. For example, when the starting index is 0, the length of a set of consecutive interlaces may be 1 to 10. Similarly, when the starting index is 1, the length of a set of consecutive interlaces may be 1 to 9. When the starting index is 9, the length of a set of consecutive interlaces can be 1 only since there is only interlace 9 in the set of consecutive interlaces. Therefore, Table 1 would have a total of 10+9+ . . . +1=55 different sets of consecutive interlaces.

To encode a total of 55 different sets of consecutive interlaces with binary encoding, a 6-bit bit string, e.g., the bit string 511, may be used, since 6-bit bit string can encode a set of $2^6$=64 options. Each pair of indices (a, b) in Table 1, representing a set of consecutive interlaces, may be represented by a 6-bit number. The bit string 511 uses 6 bits to indicate a set of consecutive interlaces selected from an ordered set of total 10 interlaces. Comparing to a bitmap of 10-bits to represent such a set of consecutive interlaces, the encoding of 6-bit uses fewer bits.

Figure 6:
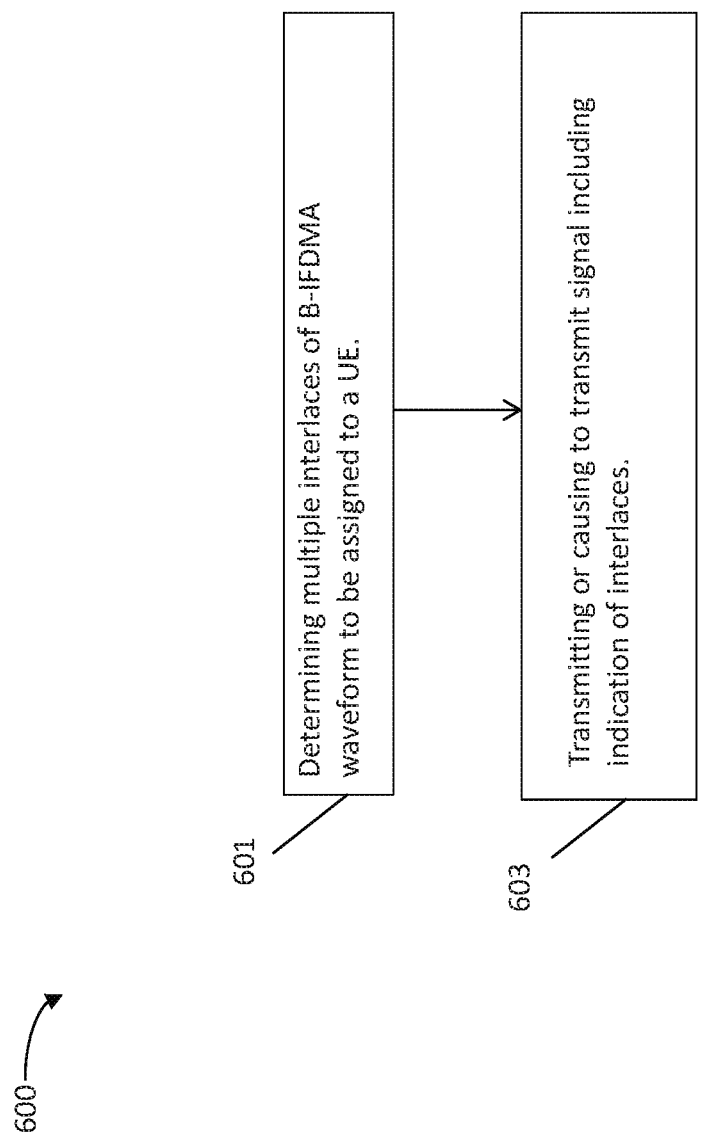
FIG. 6 illustrates an example process for interlace assignments to a UE and indications of interlace assignments, in accordance with various embodiments.

FIG. 6 illustrates an example process 600 for interlace assignments to a UE and indications of interlace assignments, in accordance with various embodiments. The process 600 may be used to assign the interlaces illustrated in FIG. 2 or FIG. 3 to a UE, e.g., a UE similar to the UE 101, the UE 103, and the UE 105 in FIG. 1. In some embodiments, the process 600 may be performed by an eNB (for example, the eNB 107 or the eNB 109 of FIG. 1). In some embodiments, the eNB may include or have access to one or more non-transitory, computer-readable media having instructions stored thereon that, when executed, cause the eNB to perform the process 600. In some embodiments, the process 600 may be performed by the electronic device 100 illustrated in FIG. 8. For example, the baseband circuitry 104 of FIG. 8 may directly perform the operations of process 600 or may cause one or more other components to perform some or all of the operations of process 600.

For example, the process 600 may include, at 601, determining multiple interlaces of a B-IFDMA waveform to be assigned to a UE. For example, the eNB 107 may determine multiple interlaces of a B-IFDMA waveform to be assigned to the UE 101 as shown in FIG. 1, where the multiple interlaces may be selected from a set of total 10 interlaces of the system bandwidth 321 as shown in FIG. 3.

The process 600 may further include, at 603, transmitting or causing to transmit a signal including indications of the interlaces to the UE. For example, the eNB 107 may transmit to the UE 101 a signal including an indication of the multiple interlaces assigned to the UE 101, as described for FIG. 1.

Figure 7:
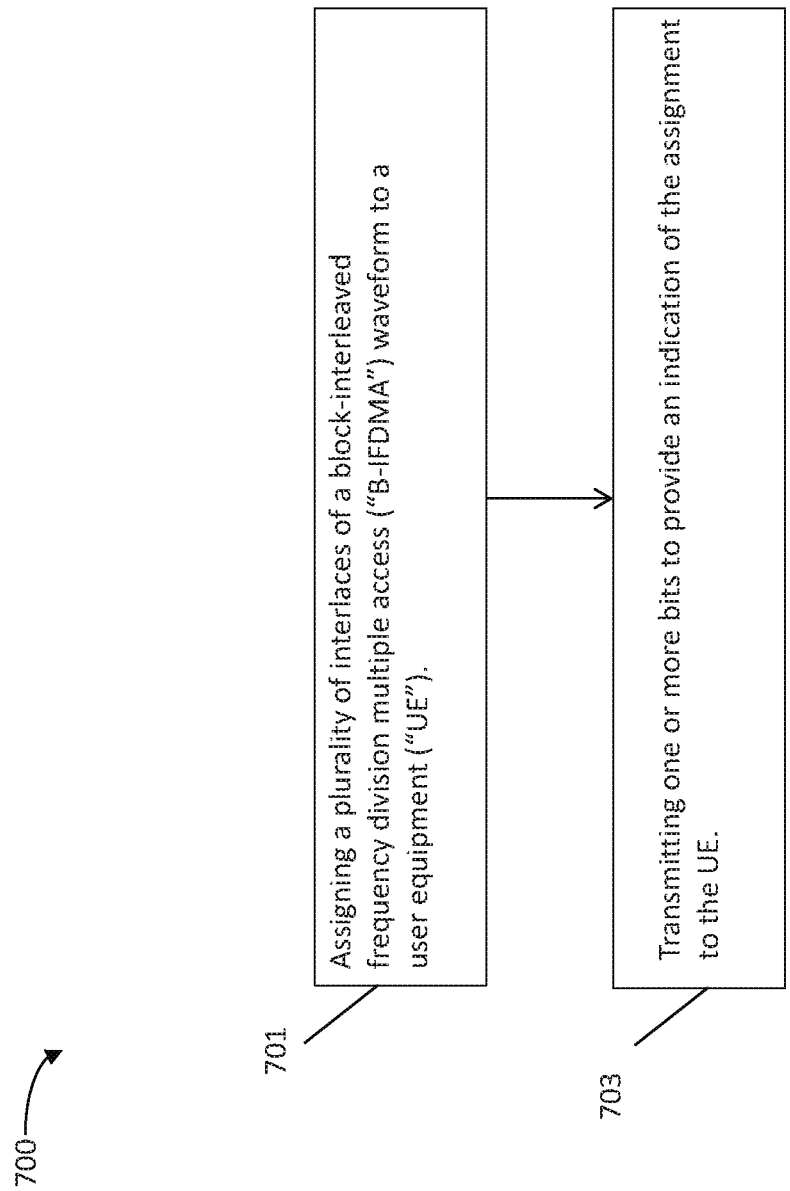
FIG. 7 illustrates another example process for interlace assignments to a UE and indications of interlace assignments, in accordance with various embodiments.

FIG. 7 illustrates another example process 700 for interlace assignments to a UE and indications of interlace assignments, in accordance with various embodiments. The process 700 may be used to assign the interlaces illustrated in FIG. 2 or FIG. 3 to a UE, e.g., a UE similar to the UE 101, the UE 103, and the UE 105 in FIG. 1. In some embodiments, the process 700 may be performed by an eNB (for example, the eNB 107 or the eNB 109 of FIG. 1). In some embodiments, the eNB may include or have access to one or more non-transitory, computer-readable media having instructions stored thereon that, when executed, cause the eNB to perform the process 700. In some embodiments, the process 700 may be performed by the electronic device 100 illustrated in FIG. 8. For example, the baseband circuitry 104 of FIG. 8 may directly perform the operations of process 700 or may cause one or more other components to perform some or all of the operations of process 700.

For example, the process 700 may include, at 701, assigning a plurality of interlaces of a B-IFDMA waveform, e.g., the system bandwidth 121, to a UE. For example, the eNB 107 may assign a plurality of interlaces of a B-IFDMA waveform to the UE 101 as shown in FIG. 1, where the plurality of interlaces may be selected from a set of total 10 interlaces of the system bandwidth 121 as shown in FIG. 3.

The process 700 may further include, at 703, transmitting one or more bits to provide an indication of the assignment to the UE. For example, the eNB 107 may transmit one or more bits to provide an indication of the assignment to the UE, as described for FIG. 1. In embodiments, the one or more bits may be the bit string 403 as shown in FIG. 4 that can indicate a set of flexible interlaces assigned to the UE, or the bit string 511 as shown in FIG. 5 that can indicate a set of consecutive interlaces from an ordered set of total number of interlaces assigned to the UE.

Figure 8:
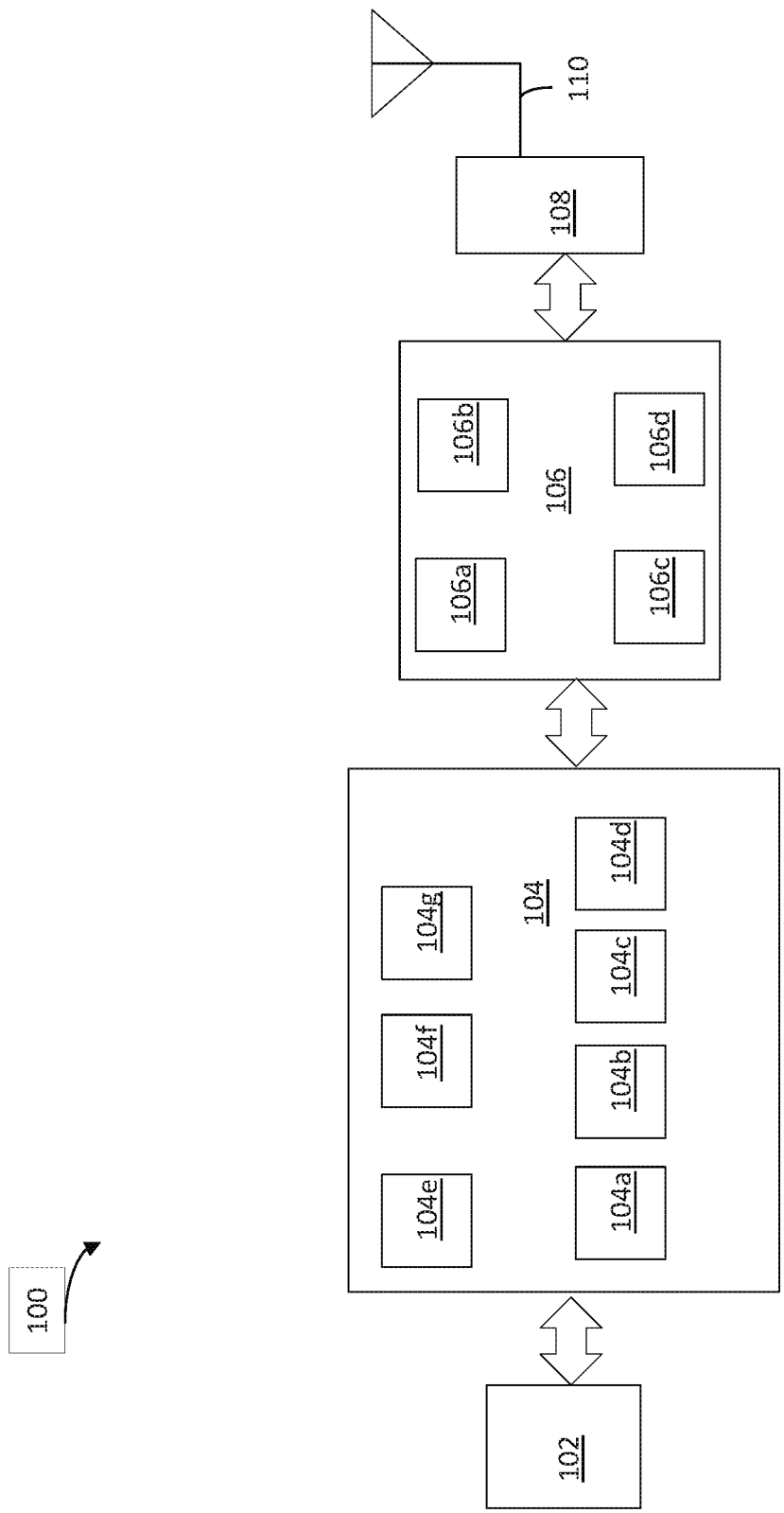
FIG. 8 illustrates a block diagram of an implementation for eNBs, and/or UEs, in accordance with various embodiments.

FIG. 8 illustrates a block diagram of an implementation for eNBs, and/or UEs, in accordance with various embodiments. In one embodiment, using any suitably configured hardware and/or software, example components of an electronic device 100 may implement an eNB or a UE of the network 120 operating in system bandwidth 121, where the system bandwidth 121 may include unlicensed spectrum, licensed spectrum, or both unlicensed and licensed spectrum. In some embodiments, the electronic device 100 may include application circuitry 102, baseband circuitry 104, radio frequency (RF) circuitry 106, front-end module (FEM) circuitry 108, and one or more antennas 120, coupled together at least as shown.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuity 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an D2D or evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments.

The baseband circuitry 104 may further include memory/storage 104g. The memory/storage 104g may be used to load and store data and/or instructions for operations performed by the processors of the baseband circuitry 104. Memory/storage for one embodiment may include any combination of suitable volatile memory and/or non-volatile memory.

The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the electronic device 100 may include additional elements such as, for example, memory/storage, display, camera, sensor, and/or input/output (I/O) interface.

In embodiments where the electronic device 100 is, implements, is incorporated into, or is otherwise part of an eNB, RF circuitry 106 may be to transmit a signal. The baseband circuitry 104 may be to assign, for a UE in communication with the electronic device 100, a plurality of interlaces of a B-IFDMA waveform, e.g., one or more interlaces of the system bandwidth 221 or one or more interlaces of the system bandwidth 321. The baseband circuitry 104 may also be to generate an UL grant to indicate the multiple interlaces assigned to the UE. The baseband circuitry 104 may also be to cause the RF circuitry to transmit the UL grant to the UE.

Figure 9:
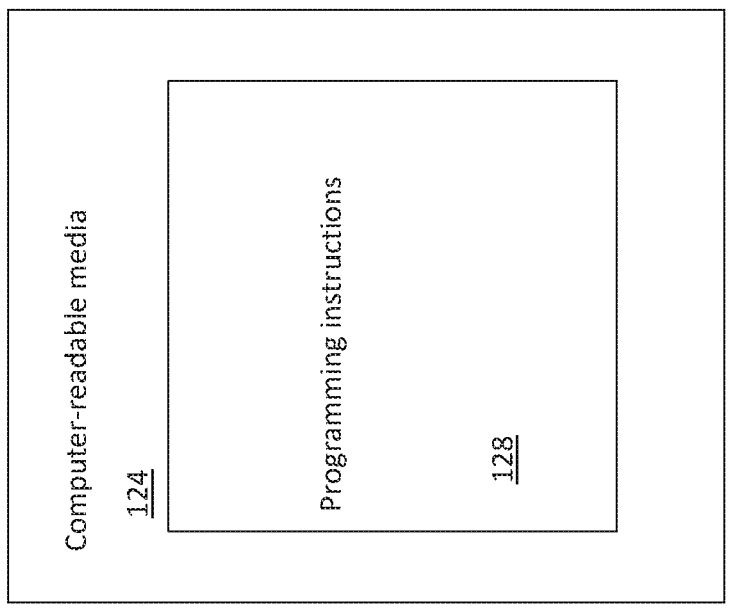
FIG. 9 illustrates an example computer-readable media, in accordance with various embodiments.

FIG. 9 illustrates an example computer-readable media, in accordance with some embodiments. FIG. 9 illustrates an example computer-readable media 124 that may be suitable for use to store instructions that cause an apparatus, in response to execution of the instructions by the apparatus, to practice selected aspects of the present disclosure. In some embodiments, the computer-readable media 124 may be non-transitory. As shown, computer-readable storage medium 124 may include programming instructions 128.

Programming instructions 128 may be configured to enable a device, for example, electronic device 100 shown in FIG. 8, a UE such as the UE 101, the UE 103, the UE 105, an eNB such as the eNB 107 and the eNB 109, as shown in FIG. 1, or another device, in response to execution of the programming instructions 128, to implement (aspects of) any of the processes or elements described throughout this disclosure related to interlace assignments to a UE, such as the process 600 in FIG. 6, or the process 700 in FIG. 7. In some embodiments, programming instructions 128 may be disposed on computer-readable media 124 that is transitory in nature, such as signals.

Any combination of one or more computer-usable or computer-readable media may be utilized. The computer-usable or computer-readable media may be, for example, but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, RAM, ROM, an erasable programmable read-only memory (for example, EPROM, EEPROM, or Flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer-usable media may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations or block diagrams of processes, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

Examples

Example 1 may contain the method of allocating resources for UL transmissions of a system operating in unlicensed spectrum, wherein multiple interlaces of the B-IFDMA waveform can be assigned to each UE by the eNB.

Example 2 may contain the method of example 1 and/or some other example herein, wherein ordering of the sequence of interlaces assigned to the UEs in different cells, can be randomized, based on the cell-ID, number of UEs in each cell, location of the UEs, etc.

Example 3 may contain one embodiment of the method of example 1 and/or some other example herein, wherein the eNB signals a bitmap to each UE, to indicate the interlace assignments. The number of bits in the bitmap equals the total number of interlaces considered in the design of the B-IFDMA waveform, and each bit indicates whether the corresponding interlace is assigned or not.

Example 4 may contain one embodiment of the method of example 1 and/or some other example herein, wherein the eNB indicates to each UE the starting position (in terms of the interlace ID) of the UL resources, and the number of (consecutive) interlaces considered for that particular user.

Example 5 may contain the method of example 3 and/or some other example herein, wherein the design of resource allocation can be cell-specific by implementation. Particularly, adjacent cells assigning multiple interlaces to their corresponding users, achieve randomization in the interlace assignments through the implementation.

Example 6 may contain the method of example 4 and/or some other example herein, wherein the ordering of the allocated interlaces to each user is different for each cell in a way that it achieves interference randomization. The cell-specific ordering may be random or predefined.

Example 7 may contain the method of example 4 and/or some other example herein, wherein the choice of ordering of interlaces, can be based on several considerations such as achieving maximum allowed output power, maximally distributing the interlaces allocated to each user to reduce transmitted PSD, the resulting peak-to-average power ratio (PAPR) and cubic metric (CM), and the maximum output power.

Example 8 may contain the method of example 4 and/or some other example herein, wherein the UL grant can indicate the interlace assignment from all possible interlace assignments, where 6 bits are enough for the indication of cases with 10 interlaces.

Example 9 may contain the method of example 4 and/or some other example herein, wherein the UL grant uses 3-4 bits to indicate the starting position of the UL resources and 4 bits to indicate the number of allocated interlaces (out of 10 available interlaces), to each UE.

Example 10 may include a method for allocating resources for uplink ("UL") transmissions in an unlicensed spectrum, wherein the method may include:

determining multiple interlaces of a block-interleaved frequency division multiple access ("B-IFDMA") waveform to be assigned to a user equipment ("UE");

transmitting or causing to transmit a signal including indications of the multiple interlaces to the UE.

Example 11 may include the method of example 10 and/or some other example herein, and may further include performing resource allocation on a per-cell basis.

Example 12 may include the method of example 11 and/or some other example herein, wherein performing resource allocation on a per-cell basis may include assigning, by adjacent cells, multiple interlaces to corresponding users to achieve randomization in interlace assignments.

Example 13 may include the method of example 10 and/or some other example herein, and may further include ordering of sequences of interlaces assigned to UEs in different cells.

Example 14 may include the method of example 13 and/or some other example herein wherein ordering of sequences of interlaces may include randomizing sequences.

Example 15 may include the method of example 14, wherein randomizing sequences may include randomizing sequences based on one or more of: cell-ID, a number of UEs in each cell, and/or location of the UEs.

Example 16 may include the method of example 10 and/or some other example herein, wherein transmitting or causing to transmit a signal including indications of the multiple interlaces may include transmitting or causing to transmit a bitmap to each UE to indicate interlace assignments.

Example 17 may include the method of example 16 and/or some other example herein wherein:

a number of bits in the bitmap may equal a total number of interlaces considered in the design of the B-IFDMA waveform; and each bit may indicate whether the corresponding interlace is assigned or not.

Example 18 may include the method of example 10 and/or some other example herein, wherein transmitting or causing to transmit a signal including indications of the multiple interlaces may include transmitting or causing to transmit to each UE:

a starting position in terms of interlace ID of UL resources; and a number of consecutive interlaces considered for a particular user.

Example 19 may include the method of example 18 and/or some other example herein, wherein the ordering of the allocated interlaces to each user may be different for each cell to achieve interference randomization.

Example 20 may include the method of example 19 and/or some other example herein, wherein the cell-specific ordering may be random or predefined.

Example 21 may include the method of example 18 and/or some other example herein, and may further include ordering interlaces based on one or more of: achievement of maximum allowed output power, maximal distribution of interlaces allocated to each user to reduce transmitted Power Spectral Density ("PSD"), a resulting peak-to-average power ratio ("PAPR") and/or cubic metric ("CM"), and/or maximum output power.

Example 22 may include the method of example 18 and/or some other example herein, wherein transmitting or causing to transmit a signal including indications of the multiple interlaces may include transmitting or causing to transmit an interlace assignment from multiple possible interlace assignments.

Example 23 may include the method of example 22 and/or some other example herein, wherein transmitting or causing to transmit a signal including indications of the multiple interlaces may include transmitting or causing to transmit 6 bits to indicate one of 10 possible interlaces.

Example 24 may include the method of example 18 and/or some other example herein, wherein transmitting or causing to transmit a signal including indications of the multiple interlaces may include transmitting or causing to transmit 3 or 4 bits to indicate a starting position of UL resources and 4 bits to indicate a number of allocated interlaces (out of 10 available interlaces), to each UE.

Example 25 may include the method of any of example 1-24, wherein the method is performed by an evolved NodeB or a portion or implementation thereof.

Example 26 may include an evolved NodeB ("eNB") including:

radio frequency ("RF") circuitry to transmit a signal; and baseband circuitry coupled with the RF circuitry, the baseband circuitry to:

assign, for a user equipment ("UE") in communication with the eNB, a plurality of interlaces of a block-interleaved frequency division multiple access ("B-IFDMA") waveform;

generate an uplink ("UL") grant to assign the multiple interlaces to the UE; and cause the RF circuitry to transmit an indication of the UL grant to the UE.

Example 27 may include the eNB of example 26 and/or some other example herein, wherein the baseband circuitry may further be to allocate resources on a per-cell basis.

Example 28 may include the eNB of example 27 and/or some other example herein, wherein the baseband circuitry may be to allocate resources on a per-cell basis by assigning, for adjacent cells, multiple interlaces to corresponding users to achieve randomization in interlace assignments.

Example 29 may include the eNB of example 26 and/or some other example herein, wherein the baseband circuitry may further be to order sequences of interlaces assigned to UEs in different cells.

Example 30 may include the eNB of example 29 and/or some other example herein wherein ordering of sequences of interlaces may include randomizing sequences.

Example 31 may include the eNB of example 30, wherein randomizing sequences may include randomizing sequences based on one or more of: cell-ID, a number of UEs in each cell, and/or location of the UEs.

Example 32 may include the eNB of example 26 and/or some other example herein, wherein the baseband circuitry may further be to generate the UL to include a bitmap to each UE to indicate interlace assignments.

Example 33 may include the eNB of example 32 and/or some other example herein wherein:

a number of bits in the bitmap may equal a total number of interlaces considered in the design of the B-IFDMA waveform; and each bit may indicate whether the corresponding interlace is assigned or not.

Example 34 may include the eNB of example 26 and/or some other example herein, wherein the baseband circuitry may be to generate the UL grant to include:
  a starting position in terms of interlace ID of UL resources; and
  a number of consecutive interlaces considered for a particular user.

Example 35 may include the eNB of example 34 and/or some other example herein, wherein the ordering of the allocated interlaces to each user may be different for each cell to achieve interference randomization.

Example 36 may include the eNB of example 35 and/or some other example herein, wherein the cell-specific ordering may be random or predefined.

Example 37 may include the eNB of example 34 and/or some other example herein, wherein the baseband circuitry may further be to order interlaces based on one or more of: achievement of maximum allowed output power, maximal distribution of interlaces allocated to each user to reduce transmitted Power Spectral Density ("PSD"), a resulting peak-to-average power ratio ("PAPR") and/or cubic metric ("CM"), and/or maximum output power.

Example 38 may include the eNB of example 34 and/or some other example herein, wherein the baseband circuitry may further be to generate the UL grant to include an interlace assignment from multiple possible interlace assignments.

Example 39 may include the eNB of example 38 and/or some other example herein, wherein the baseband circuitry may further be to generate the UL grant to include 6 bits to indicate one of 10 possible interlaces.

Example 40 may include the eNB of example 34 and/or some other example herein, wherein the baseband circuitry may further be to include 3 or 4 bits in the UL grant to indicate a starting position of UL resources and 4 bits to indicate a number of allocated interlaces (out of 10 available interlaces), to each UE.

Example 41 may include one or more computer-readable media having instructions that, when executed, cause an evolved Node B ("eNB") to:
  assign a plurality of interlaces of a block-interleaved frequency division multiple access ("B-IFDMA") waveform to a user equipment ("UE"); and
  transmit one or more bits to provide an indication of the assignment to the UE.

Example 42 may include the one or more computer-readable media of example 41 and/or some other examples herein, wherein the one or more bits are a bitmap including a number of bits corresponding to a set of total number of interlaces from which the plurality of interlaces are assigned, a bit in the bitmap indicates whether a corresponding interlace in the set of total number of interlaces is assigned to the UE or not.

Example 43 may include the one or more computer-readable media of example 41 and/or some other examples herein, wherein the plurality of interlaces are assigned from a set of total number of interlaces, each interlace of the set of total number of interlaces has an index, the one or more bits are a binary encoding of an assignment selected from a set of assignments, and the assignment of the set of assignments is indicated by an index of a starting interlace of the plurality of interlaces and a number of consecutive interlaces being assigned to the UE.

Example 44 may include the one or more computer-readable media of example 43 and/or some other examples herein, wherein an interlace of the set of total number of interlaces has an index ordered between interlace 0 to interlace 9, the assignment is selected from the set of assignments including 55 assignments for interlace 0 to interlace 9, and the assignment is indicated by 6 bits.

Example 45 may include the one or more computer-readable media of any of examples 41-44 and/or some other examples herein, wherein the assignment is generated in a predefined way, or randomly based on an identification of a cell provided by the eNB, a number of UEs in the cell, or a location of the UE within the cell.

Example 46 may include the one or more computer-readable media of any of examples 41-44 and/or some other examples herein, wherein the B-IFDMA waveform is on an unlicensed spectrum.

Example 47 may include an apparatus to be used in an evolved Node B (eNB) in a mobile communication network to communicate with a user equipment (UE), comprising:
  a memory storing instructions; and
  processing circuitry to execute the instructions stored in the memory to:
    generate an assignment of one or more interlaces to the UE within a cell managed by the eNB, wherein the one or more interlaces are selected from a total number of interlaces of a block-interleaved frequency division multiple access ("B-IFDMA") waveform within a system bandwidth; and
    indicate the assignment by a bit string including one or more bits.

Example 48 may include the apparatus of example 47 and/or some other examples herein, wherein the bit string is a bitmap including a number of bits corresponding to the total number of interlaces, a bit in the bitmap indicates whether a corresponding interlace of the total number of interlaces is assigned to the UE or not.

Example 49 may include the apparatus of example 47 and/or some other examples herein, wherein each interlace of the total number of interlaces has an index, the bit string is a binary encoding of an assignment selected from a set of assignments, and the assignment of the set of assignments is indicated by an index of a starting interlace of the one or more interlaces and a number of consecutive interlaces being assigned to the UE.

Example 50 may include the apparatus of example 49 and/or some other examples herein, wherein an interlace of the total number of interlaces has an index ordered between interlace 0 to interlace 9, the bit string has 6 bits to encode the assignment selected from the set of assignments including 55 assignments for interlace 0 to interlace 9.

Example 51 may include the apparatus of any of examples 47-50 and/or some other examples herein, wherein the assignment is generated in a predefined way, or randomly based on an identification of the cell, a number of UEs in the cell, or a location of the UE within the cell.

Example 52 may include the apparatus of any of examples 47-50 and/or some other examples herein, wherein the assignment is generated by a first randomization method, and a second UE in a neighboring cell to the cell is assigned a second assignment generated by a second randomization method different from the first randomization method.

Example 53 may include the apparatus of any of examples 47-50 and/or some other examples herein, wherein the assignment is generated based on a power spectral density of the cell, a transmission power constraint of the UE, an allowed output power of the UE, a peak-to-average power ratio (PAPR) of the UE, or a cubic metric (CM) of the cell.

Example 54 may include the apparatus of any of examples 47-50 and/or some other examples herein, wherein the system bandwidth is on an unlicensed spectrum.

Example 55 may include the apparatus of any of examples 47-50 and/or some other examples herein, wherein the UE is to communicate with the eNB on a licensed spectrum and an unlicensed spectrum.

Example 56 may include the apparatus of any of examples 47-50 and/or some other examples herein, wherein the total number of interlaces is 5, 6, 10, or 12. Example 57 may include the apparatus of any of examples 47-50 and/or some other examples herein, further comprising:
  a transmitter to transmit the bit string to the UE, wherein the bit string is transmitted to the UE by radio resource control (RRC) signaling, a system information block (SIB), or an uplink (UL) grant.

Example 58 may include one or more computer-readable media having instructions that, when executed, cause an evolved Node B ("eNB") in a mobile communication network to communicate with a user equipment (UE), to:
  generate an assignment of one or more interlaces to the UE within a cell managed by the eNB, wherein the one or more interlaces are selected from a total number of interlaces, an interlace of the total number of interlaces includes multiple equally spaced resource blocks spanning within a system bandwidth;
  indicate the assignment by a bit string including one or more bits; and
  transmit the bit string to the UE.

Example 59 may include the one or more computer-readable media of example 58 and/or some other examples herein, wherein the bit string is a bitmap including a number of bits corresponding to the total number of interlaces, a bit in the bitmap indicates whether a corresponding interlace of the total number of interlaces is assigned to the UE or not.

Example 60 may include the one or more computer-readable media of example 58 and/or some other examples herein, wherein each interlace of the total number of interlaces has an index, the bit string is a binary encoding of an assignment selected from a set of assignments, and the assignment of the set of assignments is indicated by an index of a starting interlace of the one or more interlaces and a number of consecutive interlaces being assigned to the UE.

Example 61 may include the one or more computer-readable media of example 60 and/or some other examples herein, wherein an interlace of the total number of interlaces has an index ordered between interlace 0 to interlace 9, the bit string has 6 bits to encode the assignment selected from the set of assignments including 55 assignments for interlace 0 to interlace 9.

Example 62 may include the one or more computer-readable media of any of examples 58-61 and/or some other examples herein, wherein the assignment is generated in a predefined way, or randomly based on an identification of the cell, a number of UEs in the cell, or a location of the UE within the cell.

Example 63 may include the one or more computer-readable media of any of examples 58-61 and/or some other examples herein, wherein the assignment is generated by a first randomization method, and a second UE in a neighboring cell to the cell is assigned a second assignment generated by a second randomization method different from the first randomization method.

Example 64 may include the one or more computer-readable media of any of examples 58-61 and/or some other examples herein, wherein the system bandwidth is on an unlicensed spectrum.

Example 65 may include the one or more computer-readable media of any of examples 58-61 and/or some other examples herein, wherein the UE is to communicate with the eNB on a licensed spectrum or an unlicensed spectrum.

Example 66 may include one or more computer-readable media comprising instructions that, when executed, cause a user equipment (UE) to:
  identify one or more bits to provide an indication of an assignment of a plurality of interlaces of a block-interleaved frequency division multiple access (B-IFDMA) waveform by an evolved Node B (eNB);
  decode the one or more bits to determine the plurality of interlaces;
  communicate with the eNB using the plurality of interlaces.

Example 67 may include the one or more computer-readable media of example 66 and/or some other examples herein, wherein the one or more bits are a bitmap including a number of bits corresponding to a set of total number of interlaces from which the plurality of interlaces are assigned, a bit in the bitmap to indicate whether a corresponding interlace in the set of total number of interlaces is assigned to the UE.

Example 68 may include the one or more computer-readable media of example 66 and/or some other examples herein, wherein the plurality of interlaces are assigned from a set of total number of interlaces, each interlace of the set of total number of interlaces has an index, the one or more bits are a binary encoding of an assignment selected from a set of assignments, and the assignment of the set of assignments is indicated by an index of a starting interlace of the plurality of interlaces and a number of consecutive interlaces being assigned to the UE.

Example 69 may include the one or more computer-readable media of example 68 and/or some other examples herein, wherein individual interlaces of the set of total number of interlaces have indices ordered between interlace 0 to interlace 9, the assignment is selected from the set of assignments including 55 assignments for interlace 0 to interlace 9, and the assignment is indicated by 6 bits.

Example 70 may include the one or more computer-readable media of any of examples 66-69 and/or some other examples herein, wherein the B-IFDMA waveform is on an unlicensed spectrum.

Example 71 may include the one or more computer-readable media of any of examples 66-69 and/or some other examples herein, wherein the one or more bits are received by radio resource control (RRC) signaling, a system information block (SIB), or an uplink (UL) grant.

Example 72 may include an apparatus comprising means to perform one or more elements of a method described in or related to any of examples 1-71, or any other method or process described herein.

Example 73 may include one or more non-transitory computer-readable media comprising instructions to cause an electronic device, upon execution of the instructions by one or more processors of the electronic device, to perform one or more elements of a method described in or related to any of examples 1-71, or any other method or process described herein.

Example 74 may include an apparatus comprising logic, modules, and/or circuitry to perform one or more elements of a method described in or related to any of examples 1-71, or any other method or process described herein.

Example 75 may include a method, technique, or process as described in or related to any of examples 1-71, or portions or parts thereof.

Example 76 may include an apparatus comprising: one or more processors and one or more computer readable media comprising instructions that, when executed by the one or more processors, cause the one or more processors to perform the method, techniques, or process as described in or related to any of examples 1-71, or portions thereof.

Example 77 may include a method of communicating in a wireless network as shown and described herein.

Example 78 may include a system for providing wireless communication as shown and described herein.

Example 79 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory computer-readable media comprising instructions that, when executed, cause a user equipment (UE) to:
identify one or more bits to provide an indication of an assignment of a plurality of interlaces of a block-interleaved frequency division multiple access (B-IFDMA) waveform by an evolved Node B (eNB);
decode the one or more bits to determine the plurality of interlaces; and
communicate with the eNB using the plurality of interlaces,
wherein the plurality of interlaces are assigned from a set of total number of interlaces, each interlace of the set of total number of interlaces has an index, the one or more bits are an encoding of an assignment selected from a set of assignments, and the assignments of the set of assignments is indicated by an index of a starting interlace of the plurality of interlaces and a number of consecutive interlaces being assigned to the UE.

2. The one or more non-transitory computer-readable media of claim 1, wherein the one or more bits are a bitmap including a number of bits corresponding to a set of total number of interlaces from which the plurality of interlaces are assigned, a bit in the bitmap to indicate whether a corresponding interlace in the set of total number of interlaces is assigned to the UE.

3. The one or more non-transitory computer-readable media of claim 1, wherein the one or more bits are a binary encoding of the assignment selected from the set of assignments.

4. The one or more non-transitory computer-readable media of claim 1, wherein individual interlaces of the set of total number of interlaces have indices ordered between interlace 0 to interlace 9, the assignment is selected from the set of assignments including 55 assignments for interlace 0 to interlace 9, and the assignment is indicated by 6 bits.

5. The one or more non-transitory computer-readable media of claim 1, wherein the B-IFDMA waveform is on an unlicensed spectrum.

6. The one or more non-transitory computer-readable media of claim 1, wherein the one or more bits are received by radio resource control (RRC) signaling, a system information block (SIB), or an uplink (UL) grant.

7. An apparatus to be used in an evolved Node B (eNB) in a mobile communication network to communicate with a user equipment (UE), comprising:
a memory storing instructions; and
processing circuitry to execute the instructions stored in the memory to:
generate an assignment of one or more interlaces to the UE within a cell managed by the eNB, wherein the one or more interlaces are selected from a total number of interlaces of a block-interleaved frequency division multiple access ("B-IFDMA") waveform within a system bandwidth; and
indicate the assignment by a bit string including one or more bits;
wherein each interlace of the total number of interlaces has an index, the bit string is an encoding of an assignment selected from a set of assignments, and the assignment of the set of assignments is indicated by an index of a starting interlace of the one or more interlaces and a number of consecutive interlaces being assigned to the UE.

8. The apparatus of claim 7, wherein the bit string is a bitmap including a number of bits corresponding to the total number of interlaces, a bit in the bitmap to indicate whether a corresponding interlace in the set of total number of interlaces is assigned to the UE.

9. The apparatus of claim 7, wherein the bit string is a binary encoding of the assignment selected from the set of assignments.

10. The apparatus of claim 7, wherein individual interlaces of the set of total number of interlaces have indices ordered between interlace 0 to interlace 9, the bit string has 6 bits to encode the assignment selected from the set of assignments including 55 assignments for interlace 0 to interlace 9.

11. The apparatus of claim 7, wherein the assignment is generated in a predefined way, or randomly based on an identification of the cell, a number of UEs in the cell, or a location of the UE within the cell.

12. The apparatus of claim 7, wherein the assignment is generated by a first randomization method, and a second UE in a neighboring cell to the cell is assigned a second assignment generated by a second randomization method different from the first randomization method.

13. The apparatus of claim 7, wherein the assignment is generated based on a power spectral density of the cell, a transmission power constraint of the UE, an allowed output power of the UE, a peak-to-average power ratio (PAPR) of the UE, or a cubic metric (CM) of the cell.

14. The apparatus of claim 7, wherein the system bandwidth is on an unlicensed spectrum.

15. The apparatus of claim 7, wherein the UE is to communicate with the eNB on a licensed spectrum and an unlicensed spectrum.

16. The apparatus of claim 7, wherein the total number of interlaces is 5, 6, 10, or 12.

17. The apparatus of claim 7, further comprising:
a transmitter to transmit the bit string to the UE, wherein the bit string is transmitted to the UE by radio resource control (RRC) signaling, a system information block (SIB), or an uplink (UL) grant.

18. One or more non-transitory computer-readable media having instructions that, when executed, cause an evolved Node B ("eNB") in a mobile communication network to communicate with a user equipment (UE), to:
generate an assignment of one or more interlaces to the UE within a cell managed by the eNB, wherein the one or more interlaces are selected from a total number of interlaces, an interlace of the total number of interlaces includes multiple equally spaced resource blocks spanning within a system bandwidth;
indicate the assignment by a bit string including one or more bits; and transmit the bit string to the UE;

wherein each interlace of the total number of interlaces has an index, the bit string is an encoding of an assignment selected from a set of assignments, and the assignment of the set of assignments is indicated by an index of a starting interlace of the one or more interlaces and a number of consecutive interlaces being assigned to the UE.

19. The one or more non-transitory computer-readable media of claim 18, wherein the bit string is a bitmap including a number of bits corresponding to the total number of interlaces, a bit in the bitmap to indicate whether a corresponding interlace in the set of total number of interlaces is assigned to the UE.

20. The one or more non-transitory computer-readable media of claim 18, wherein the bit string is a binary encoding of the assignment selected from the set of assignments.

21. The one or more non-transitory computer-readable media of claim 18, wherein individual interlaces of the set of total number of interlaces have indices ordered between interlace 0 to interlace 9, the bit string has 6 bits to encode the assignment selected from the set of assignments including 55 assignments for interlace 0 to interlace 9.

22. The one or more non-transitory computer-readable media of claim 18, wherein the assignment is generated in a predefined way, or randomly based on an identification of the cell, a number of UEs in the cell, or a location of the UE within the cell.

23. The one or more non-transitory computer-readable media of claim 18, wherein the assignment is generated by a first randomization method, and a second UE in a neighboring cell to the cell is assigned a second assignment generated by a second randomization method different from the first randomization method.

24. The one or more non-transitory computer-readable media of claim 18, wherein the system bandwidth is on an unlicensed spectrum.

25. The one or more non-transitory computer-readable media of claim 18, wherein the UE is to communicate with the eNB on a licensed spectrum or an unlicensed spectrum.

26. A method comprising:
identifying, by a user equipment (UE), one or more bits to provide an indication of an assignment of a plurality of interlaces of a block-interleaved frequency division multiple access (B-IFDMA) waveform by an evolved Node B (eNB);
decoding, by the UE, the one or more bits to determine the plurality of interlaces; and
communicating, by the UE, with the eNB using the plurality of interlaces;
wherein the plurality of interlaces are assigned from a set of total number of interlaces, each interlace of the set of total number of interlaces has an index, the one or more bits are an encoding of an assignment selected from a set of assignments, and the assignment of the set of assignments is indicated by an index of a starting interlace of the plurality of interlaces and a number of consecutive interlaces being assigned to the UE.

27. The method of claim 26, wherein the one or more bits are a bitmap including a number of bits corresponding to a set of total number of interlaces from which the plurality of interlaces are assigned, a bit in the bitmap to indicate whether a corresponding interlace in the set of total number of interlaces is assigned to theUE.

28. The method of claim 26, wherein the one or more bits are a binary encoding of the assignment selected from the set of assignments.

29. The method of claim 26, wherein individual interlaces of the set of total number of interlaces have indices ordered between interlace 0 to interlace 9, the assignment is selected from the set of assignments including 55 assignments for interlace 0 to interlace 9, and the assignment is indicated by 6 bits.

30. The method of claim 26, wherein the B-IFDMA waveform is on an unlicensed spectrum.

31. The method of claim 26, wherein the one or more bits are received by radio resource control (RRC) signaling, a system information block (SIB), or an uplink (UL) grant.

* * * * *

UNITED STATES PATENT AND TRADEMARK OFFICE
CERTIFICATE OF CORRECTION

PATENT NO. : 10,856,282 B2
APPLICATION NO. : 16/072132
DATED : December 1, 2020
INVENTOR(S) : Fatemeh Hamidi-Sepehr et al.

Page 1 of 1

It is certified that error appears in the above-identified patent and that said Letters Patent is hereby corrected as shown below:

In the Claims

Column 21, Line 28-29, in Claim 1, delete "interlaces," and insert -- interlaces; --;

Column 21, Line 34, in Claim 1, delete "and the assignments of the" and insert -- and the assignment of the --; and Column 24, Line 24, in Claim 27, delete "theUE." and insert -- the UE. --.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*